US010490088B2

(12) United States Patent
Dill et al.

(10) Patent No.: US 10,490,088 B2
(45) Date of Patent: Nov. 26, 2019

(54) ASSURED GEO-CONTAINMENT SYSTEM FOR UNMANNED AIRCRAFT

(71) Applicant: U.S.A. as represented by the Administrator of the National Aeronautics and Space Administration, Washington, DC (US)

(72) Inventors: Evan T. Dill, Poquoson, VA (US); Kyle M. Smalling, Newport News, VA (US); Steven D. Young, Poquoson, VA (US); Cuong C. Quach, Hampton, VA (US); Kelly J. Hayhurst, Seaford, VA (US); Anthony J. Narkawicz, Newport News, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 145 days.

(21) Appl. No.: 15/386,041

(22) Filed: Dec. 21, 2016

(65) Prior Publication Data
US 2017/0193827 A1 Jul. 6, 2017

Related U.S. Application Data

(60) Provisional application No. 62/329,234, filed on Apr. 29, 2016, provisional application No. 62/272,742, filed on Dec. 30, 2015.

(51) Int. Cl.
G08G 5/00 (2006.01)
B64C 39/02 (2006.01)
(Continued)

(52) U.S. Cl.
CPC .......... *G08G 5/006* (2013.01); *B64C 39/024* (2013.01); *G05D 1/106* (2019.05); *G08G 5/0021* (2013.01);
(Continued)

(58) Field of Classification Search
CPC .. G08G 5/0069; G08G 5/0013; G08G 5/0021; G08G 5/006
See application file for complete search history.

(56) References Cited

U.S. PATENT DOCUMENTS 8,380,425 B2\* 2/2013 Duggan ............... G08G 5/0069
244/175
8,494,693 B2\* 7/2013 Murphy ................. G08G 5/025
340/947

(Continued)

*Primary Examiner* — Redhwan K Mawari
(74) *Attorney, Agent, or Firm* — M. Bruce Harper; Andrea Z. Warmbier; Robin W. Edwards

(57) ABSTRACT

A Geo-containment system includes at least one unmanned aircraft and a control system that is configured to limit flight of the unmanned aircraft based, at least in part, on predefined Geo-spatial operational boundaries. These boundaries may include a primary boundary and at least one secondary boundary that is spaced apart from the primary boundary a minimum safe distance. The minimum safe distance is determined while the unmanned aircraft is in flight utilizing state information of the unmanned aircraft and dynamics and dynamics coefficients of the unmanned aircraft. The state information includes at least position and velocity of the unmanned aircraft. The control system is configured to alter or terminate operation of the unmanned aircraft if the unmanned aircraft violates the primary Geo-spatial operational boundary or the secondary Geo-spatial boundary.

19 Claims, 12 Drawing Sheets

(51) Int. Cl.
*H04W 4/021* (2018.01)
*G05D 1/10* (2006.01)

(52) U.S. Cl.
CPC ......... *G08G 5/0034* (2013.01); *G08G 5/0039* (2013.01); *G08G 5/0069* (2013.01); *H04W 4/021* (2013.01); *B64C 2201/141* (2013.01); *B64C 2201/146* (2013.01)

(56) References Cited

U.S. PATENT DOCUMENTS

| | | | | |
|---|---|---|---|---|
| 2009/0254275 A1* | 10/2009 | Xie | .................. | G01C 21/165 701/469 |
| 2010/0228468 A1* | 9/2010 | D'Angelo | ............ | G08G 5/0008 701/120 |
| 2011/0251800 A1* | 10/2011 | Wilkins | ................. | G01J 3/02 702/24 |
| 2012/0237028 A1* | 9/2012 | Khazan | ................ | G05D 1/0022 380/201 |
| 2013/0012231 A1* | 1/2013 | Hall | ...................... | H04W 4/021 455/456.2 |
| 2014/0018979 A1* | 1/2014 | Goossen | ............... | G08G 5/0034 701/3 |
| 2014/0249693 A1* | 9/2014 | Stark | ................... | B64C 39/024 701/2 |
| 2014/0274151 A1* | 9/2014 | Pattabiraman | ........ | H04W 4/029 455/456.3 |
| 2015/0254988 A1* | 9/2015 | Wang | .................. | G05D 1/0214 701/3 |
| 2015/0260850 A1* | 9/2015 | Deng | ................... | G01S 19/17 342/357.25 |
| 2016/0030808 A1* | 2/2016 | Uchida | ............... | G09B 19/0038 482/8 |
| 2016/0189548 A1* | 6/2016 | Thurling | .............. | G08G 5/0013 701/3 |
| 2016/0290826 A1* | 10/2016 | Brenner | ................ | G05D 1/0077 |
| 2016/0291589 A1* | 10/2016 | Ashoori | ................ | G01S 19/13 |

* cited by examiner

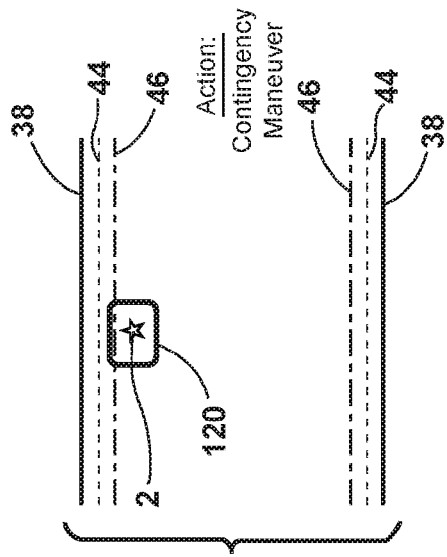
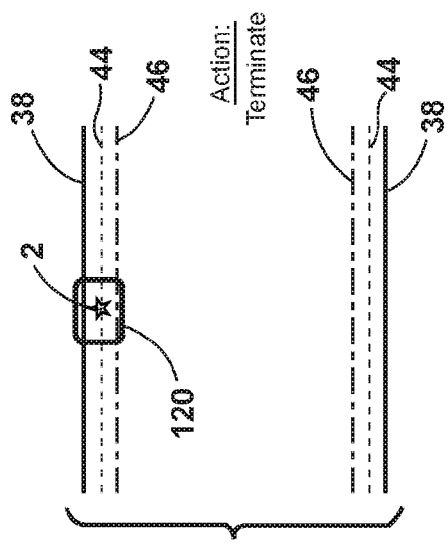
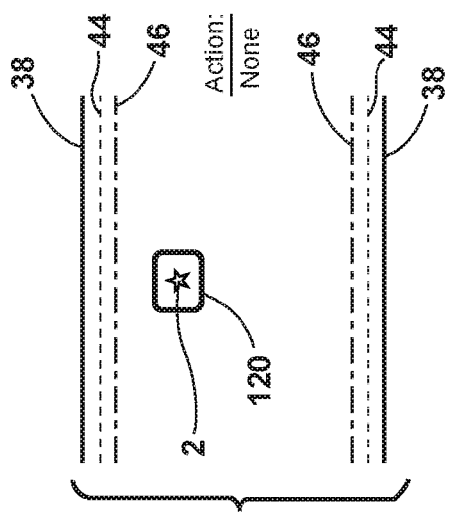
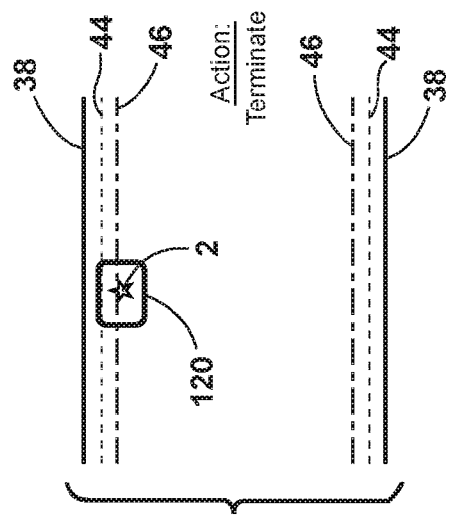

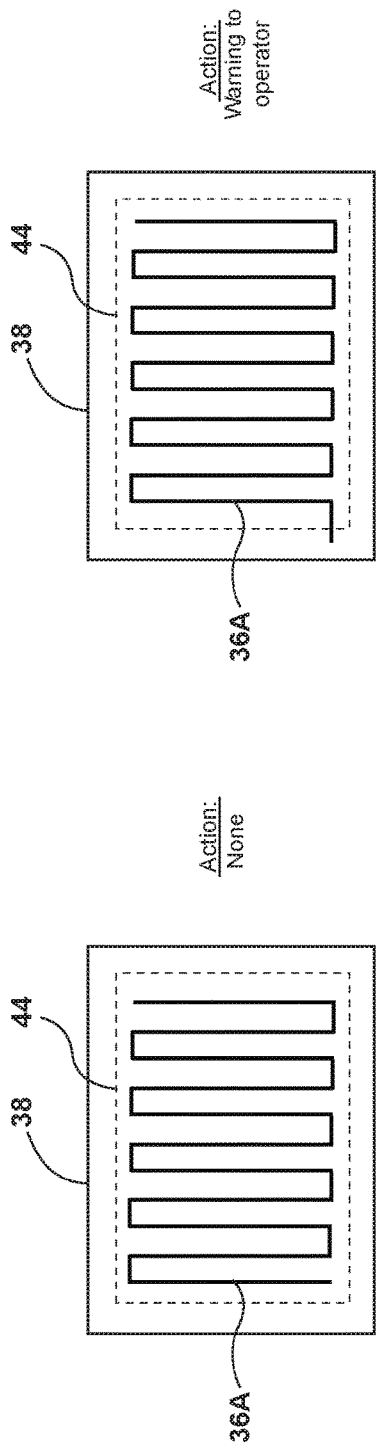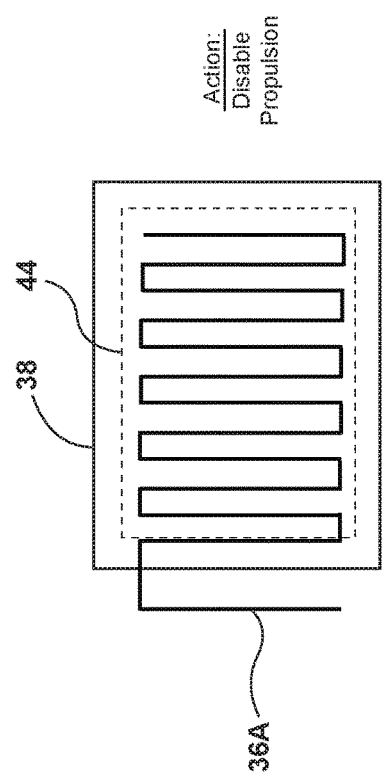

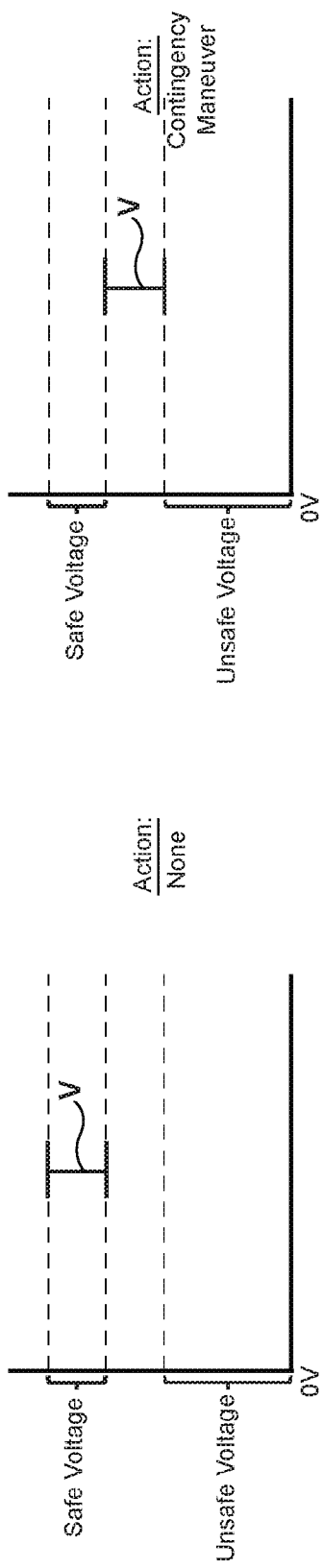
FIG. 12A
FIG. 12B
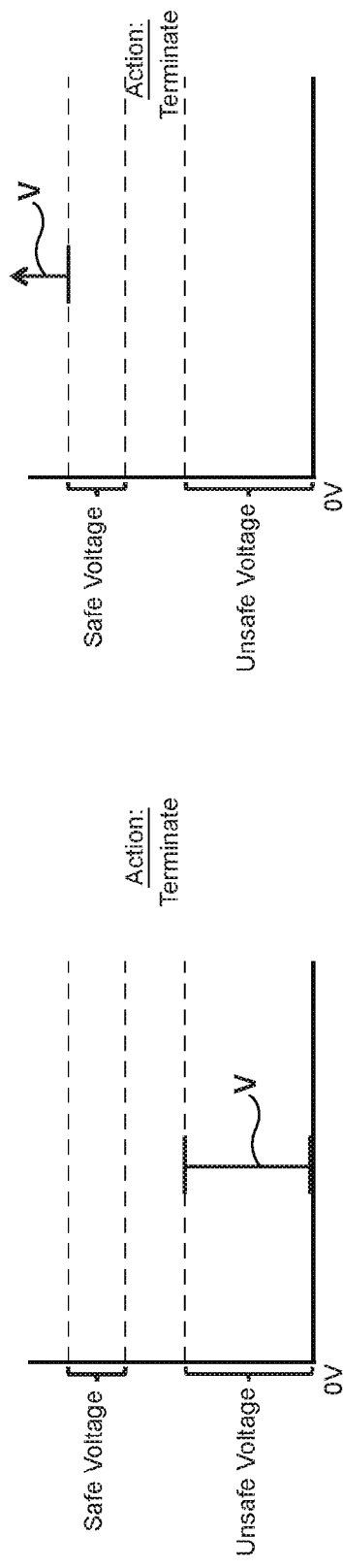
FIG. 12C
FIG. 12D

ASSURED GEO-CONTAINMENT SYSTEM FOR UNMANNED AIRCRAFT

CROSS-REFERENCE TO RELATED PATENT APPLICATION(S)

This patent application claims the benefit of and priority to U.S. Provisional Patent Application No. 62/272,742, filed on Dec. 30, 2015, and U.S. Provisional Patent Application No. 62/329,234, filed on Apr. 29, 2016, the contents of which are hereby incorporated by reference in their entirety.

STATEMENT REGARDING FEDERALLY SPONSORED RESEARCH OR DEVELOPMENT

The invention described herein was made in the performance of work under a NASA contract and by employees of the United States Government and is subject to the provisions of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore.

BACKGROUND OF THE INVENTION

Various types of unmanned aircraft systems (UAS) have been developed. UAS typically include ground-based controllers that communicate wirelessly with unmanned aircraft (UA). The Federal Aviation Administration (FAA) has received numerous reports from pilots, aircraft controllers and others about unmanned aircraft operating in areas that can put people on the ground and/or other aircraft in direct harm (i.e., operating where they should not be). Examples include unplanned UA operations near other aviation activities, near firefighting activities, and operation over populated, private or secured areas.

Legislation has been proposed to mandate technology, such as geo-fencing, to prevent such events. Geo-fencing systems are available today for some UA that provide some functionality to prevent unmanned aircraft from entering "no-fly" zones. However, existing geo-fencing technology may rely on GPS and/or non-aviation-grade autopilot systems that are subject to failure. Thus, existing geo-fencing technology does not meet current civil aviation-grade standards for reliability and integrity.

BRIEF SUMMARY OF THE INVENTION

The present disclosure includes a system for unmanned aircraft to automatically detect established boundaries of a designated geospatial operational area and prevent the unmanned aircraft (UA) from crossing the boundaries. In general, the system operates by using real-time data about the position of a UA to determine the proximity of a UA to pre-defined operational boundaries (horizontal and vertical), using a system of buffers defined for each boundary. The operational boundaries may be provided (at least in part) in databases with established "no-fly" zones (much like existing aeronautical maps). The boundaries may also be provided (uploaded) by the UAS operator. If the positioning data indicates that the UA has crossed into a buffer, the system sends a signal to the autopilot to make an optional, pre-determined contingency maneuver to avoid crossing the boundary. If the contingency maneuver fails and the aircraft continues through the buffer, the system automatically activates a flight termination maneuver prior to breaching the operational boundary. The system may use real-time positioning (that is not solely reliant on the UAS autopilot or GPS), in the scheme that is used to detect impending boundary violations. These features may be included in a system architecture that facilitates certification. A system according to the present disclosure may be utilized to provide an assured safety net for practically all unmanned aircraft operations.

An assured geo-containment system according to the present disclosure provides numerous benefits. Specifically, the system may be independent of the UA and all other onboard components of the UA, such as the autopilot. Also, the positioning system does not need to rely solely on GPS. Rather, a fully GPS-independent positioning source may be used to obtain geo-referenced state data. Furthermore, the boundaries for the no-fly-zones may be described with virtually any polygon. Thus, there are practically no limits on the shape or number of boundaries. Still further, the algorithms (criteria) for establishing whether a boundary is valid and for detecting proximity to all defined boundaries are based on rigorous mathematical models that have been formally verified.

One aspect of the present disclosure is a Geo-containment system including at least one unmanned aircraft. The Geo-containment system operates in conjunction with a termination system that is configured to limit flight of the unmanned aircraft based, at least in part, on predefined geo-spatial operational boundaries. The geo-spatial operational boundary may optionally include a stay-in region and/or one or more stay-out regions. The predefined geo-spatial operational boundaries include a primary geo-spatial operational boundary and at least one secondary geo-spatial operational boundary that is spaced apart by a minimum safe distance from the primary geo-spatial operational boundary. The minimum safe distance is determined while the unmanned aircraft is in flight utilizing, at least in part: 1) state information of the unmanned aircraft including at least altitude and velocity of the unmanned aircraft, and 2) dynamics coefficients of the unmanned aircraft. The system is configured to alter or terminate operation of the unmanned aircraft if the unmanned aircraft violates either the primary geo-spatial operational boundary or the secondary geo-spatial boundary. A violation may occur if the unmanned aircraft moves to a position in which the unmanned aircraft is less than a minimum allowable distance from either the primary geo-spatial boundary or the secondary geo-spatial boundary. The minimum allowable distance may also include an uncertainty term (i.e. potential error) with respect to a location of the unmanned aircraft.

The at least one secondary geo-spatial boundary may include a warning boundary and a soft boundary, wherein the soft boundary is located between the warning boundary and the primary geo-spatial boundary. The soft boundary may be at the minimum safe distance from the primary geo-spatial boundary, and the warning boundary may be spaced apart from the primary geo-spatial operational boundary a distance that is a scale factor, p multiplied by the minimum safe distance. The scale factor may be 1.25 or other suitable value. The control system may be configured to generate a warning if the unmanned aircraft crosses the warning boundary. The unmanned aircraft may include an auto-pilot system or other suitable control feature that causes the unmanned aircraft to perform a contingency maneuver (e.g. land the unmanned aircraft) if a warning signal is generated by the control system. The contingency maneuver may include at least one of, but is not limited to, causing the unmanned aircraft to turn, reduce altitude, and/or reduce speed.

The Geo-containment system (i.e. the unmanned aircraft) may include a first navigation system that is GPS-based, and a second navigation system that is GPS-independent. The GPS-based first navigation system may provide a first position of the unmanned aircraft during flight within first error distance. Independently of the first navigation system, the GPS-independent second navigation system may provide a second position of the unmanned aircraft during flight within a second error distance. The allowable distance may comprise virtually any suitable alternative positioning system. The allowable distance may comprise the greater of the first and second error distances. The second navigation system may comprise virtually any suitable alternative positioning system. The system may be configured to evaluate a flight plan prior to flight of the unmanned aircraft to determine if the flight plan will cause the unmanned aircraft to violate the primary geo-spatial operational boundary and/or the secondary geo-spatial boundary.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

FIG. 9A is a schematic view showing vertical boundary evaluation logic in which an error ellipse around a position of an unmanned aircraft is inside of all boundaries;

FIG. 9B is a schematic view showing vertical boundary evaluation logic in which the error ellipse has breached a warning boundary;

FIG. 9C is a schematic view showing vertical boundary evaluation logic in which the error ellipse has breached a soft boundary;

FIG. 9D is a schematic view showing vertical boundary evaluation logic in which the error ellipse has breached a hard boundary;

FIG. 10A is a schematic plan view showing pre-flight flight plan evaluation logic for normal operation;

FIG. 10B is a schematic plan view showing pre-flight flight plan evaluation logic with flight plan warning;

FIG. 10C is a schematic plan view showing pre-flight flight plan evaluation logic in which the flight plan is invalid;

FIG. 12A is a graph showing power system evaluation logic for normal operation;

FIG. 12B is a graph showing power system evaluation logic for a low voltage condition;

FIG. 12C is a graph showing power system evaluation logic for a dangerously low or zero voltage condition; and FIG. 12D is a graph showing power system evaluation logic for an excessively high voltage condition.

DETAILED DESCRIPTION OF THE INVENTION

Figure 1:
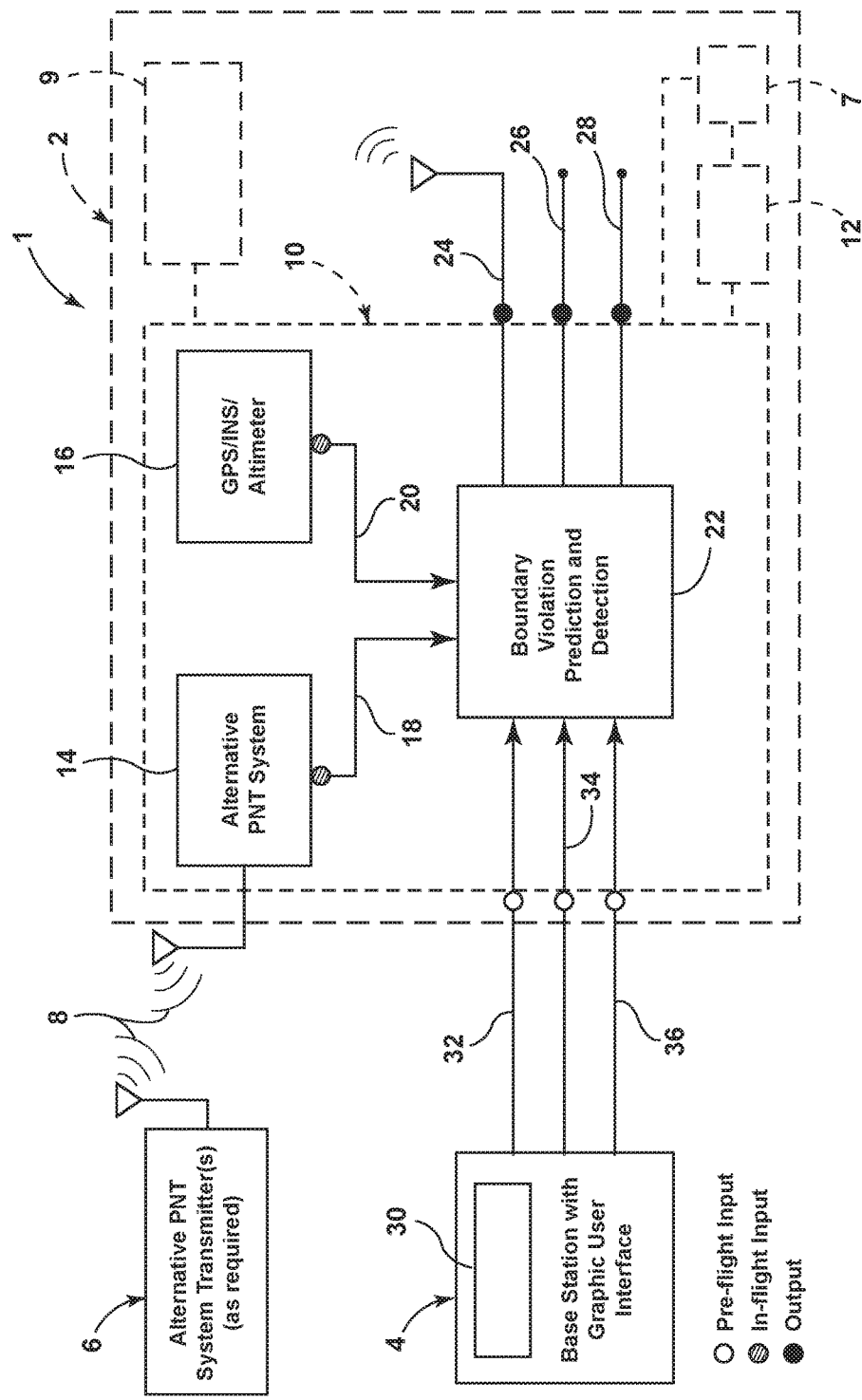
FIG. 1 is a schematic representation of a geo-containment system for unmanned aircraft according to one aspect of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, an assured Geo-containment system 1 for unmanned aircraft according to one aspect of the present disclosure includes an unmanned aircraft 2 that may be operably connected to a base station 4. It will be understood that the term "aircraft" as used herein is not limited to any specific type of aircraft, but rather refers to virtually any type of flying device such as a helicopter, drone, winged aircraft, rocket, etc. Unmanned aircraft 2 may include a controller 10 that is operably connected to a propulsion system 12. It will be understood that the controller 10 may have virtually any suitable configuration, and may include a programmable controller, electrical circuit components, software, and/or other components. Unmanned aircraft 2 may be configured to wirelessly interact with an alternate positioning, navigation, and timing ("PNT") system 6. The system 1 further includes a GPS system 16. The PNT system 14 provides GPS-independent data 18 to a boundary violation prediction and detection component 22, and GPS system 16 provides GPS-based position data 20 to the boundary violation prediction and detection component 22. The boundary violation prediction and detection component 22 may comprise a programmable controller, executable software or other suitable arrangement. As discussed in more detail below, the boundary violation prediction and detection component 22 may provide an output 24 comprising diagnostic output or a message, a termination output 26, or a warning output 28.

Referring again to FIG. 1, the base station 4 may include a graphical user interface 30 or other suitable device/feature that provides graphical and/or text data to a user, and also permits a user to input boundary points 32, vehicle dynamics coefficients 34, and flight plan data 36. These pre-flight inputs are evaluated by the boundary violation prediction and detection component 22 before and during flight of unmanned aircraft 2.

Unmanned aircraft 2 also includes an auto pilot that is operably connected to boundary violation prediction and detection component 22 and a propulsion system 12 that is operably connected to boundary violation prediction and detection component 22 and/or propulsion system 12. Unmanned aircraft 2 may also include an electrical power source/system 9 that provides electrical power to the various onboard electrical components.

Figure 2:
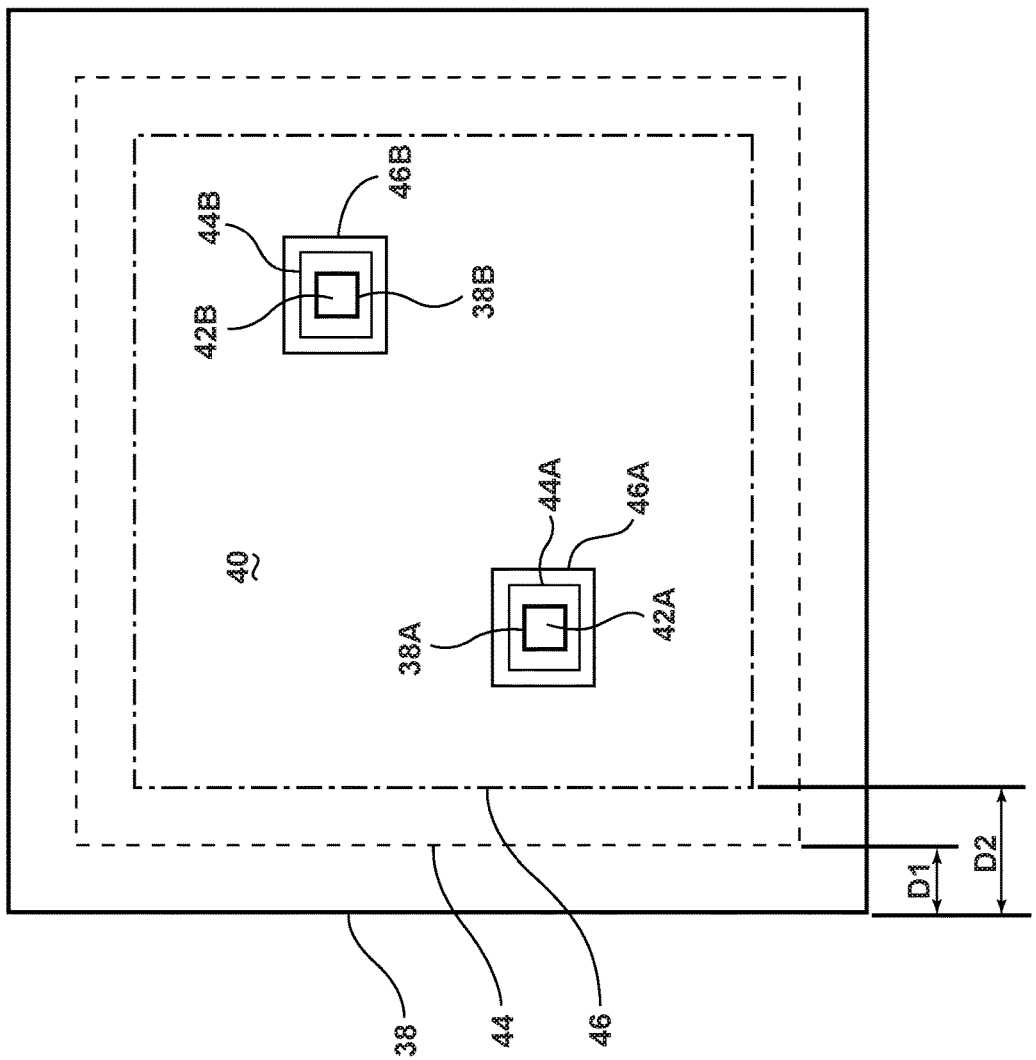
FIG. 2 is a schematic plan view showing boundaries of stay-in regions and stay-out regions that may be used by the system.

With reference to FIG. 2, the boundary points 32 define one or more hard boundaries 38, 38A, 38B, etc. In the illustrated example, the hard boundary 38 forms a stay-in region 40. The hard boundary 38A forms a stay-out region 42A, and the hard boundary 38B forms a stay-out region 42B. FIG. 2 is a schematic plan view of a geographical area, and the hard boundaries 38, 38A, 38B represent lateral boundaries. As discussed in more detail below, the system 1 may also utilize one or more vertical boundaries to limit the vertical position of the unmanned aircraft 2. The boundary violation prediction and detection component 22 of system 1 is configured to determine a soft boundary 44 and a warning boundary 46. The soft boundary 44 is spaced apart from hard boundary 38 a distance "D1," and the warning boundary 46 is spaced apart from the hard boundary 38 a distance "D2." As discussed in more detail below, the distance D1 may be equal to a minimum safe distance that is determined by the boundary violation prediction and detection component 22 utilizing vehicle dynamics coefficients 34 (FIG. 1) and position and velocity of unmanned aircraft 2 as determined by PNT system 14 and/or GPS system 16. In general, the distance D2 is greater than the distance D1. For example, the distance D2 may be 1.25 times the distance D1. However, other multiples (e.g. 1.2, 1.3, 1.5, 2.0, etc.) or criteria may also be utilized to calculate distance D2. The boundary violation prediction and detection component 22 of system 1 may also determine soft boundaries 44A and 44B, and warning boundaries 46A and 46B for stay-out regions 42A and 42B. Although the hard boundaries 38, 38A, 38B, etc. are determined prior to flight of unmanned aircraft 2 utilizing boundary point data 32, the locations of the soft boundary 44 and warning boundary 46 corresponding to distances D1 and D2, respectively, are calculated in-flight by the boundary violation prediction and detection component 22. The distances D1 and D2 may be calculated and updated at a high frequency (e.g. 100 or 1000 times or more per second).

Figure 3:
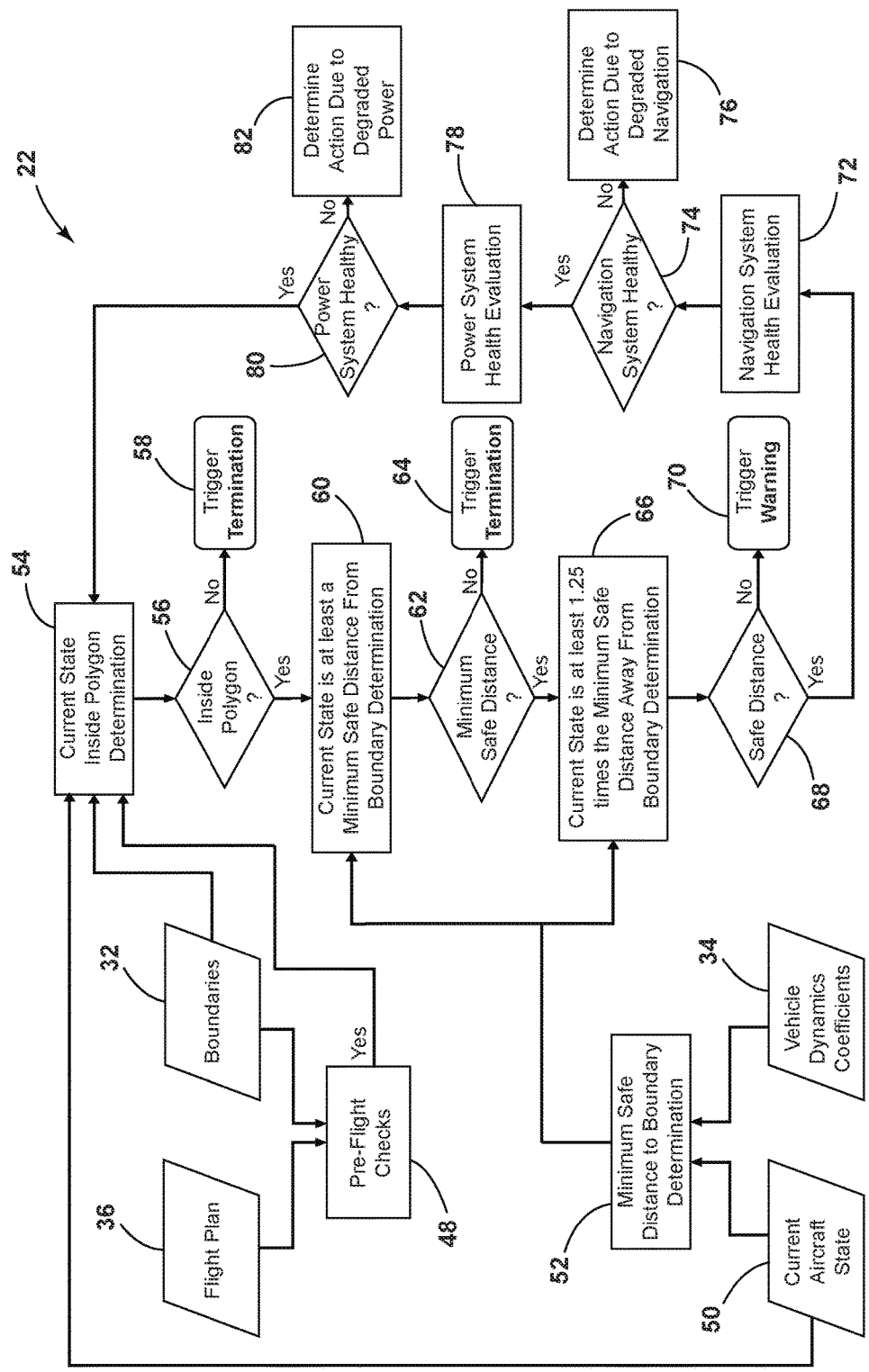
FIG. 3 is a diagram showing detection logic for stay-in regions.
Figure 4:
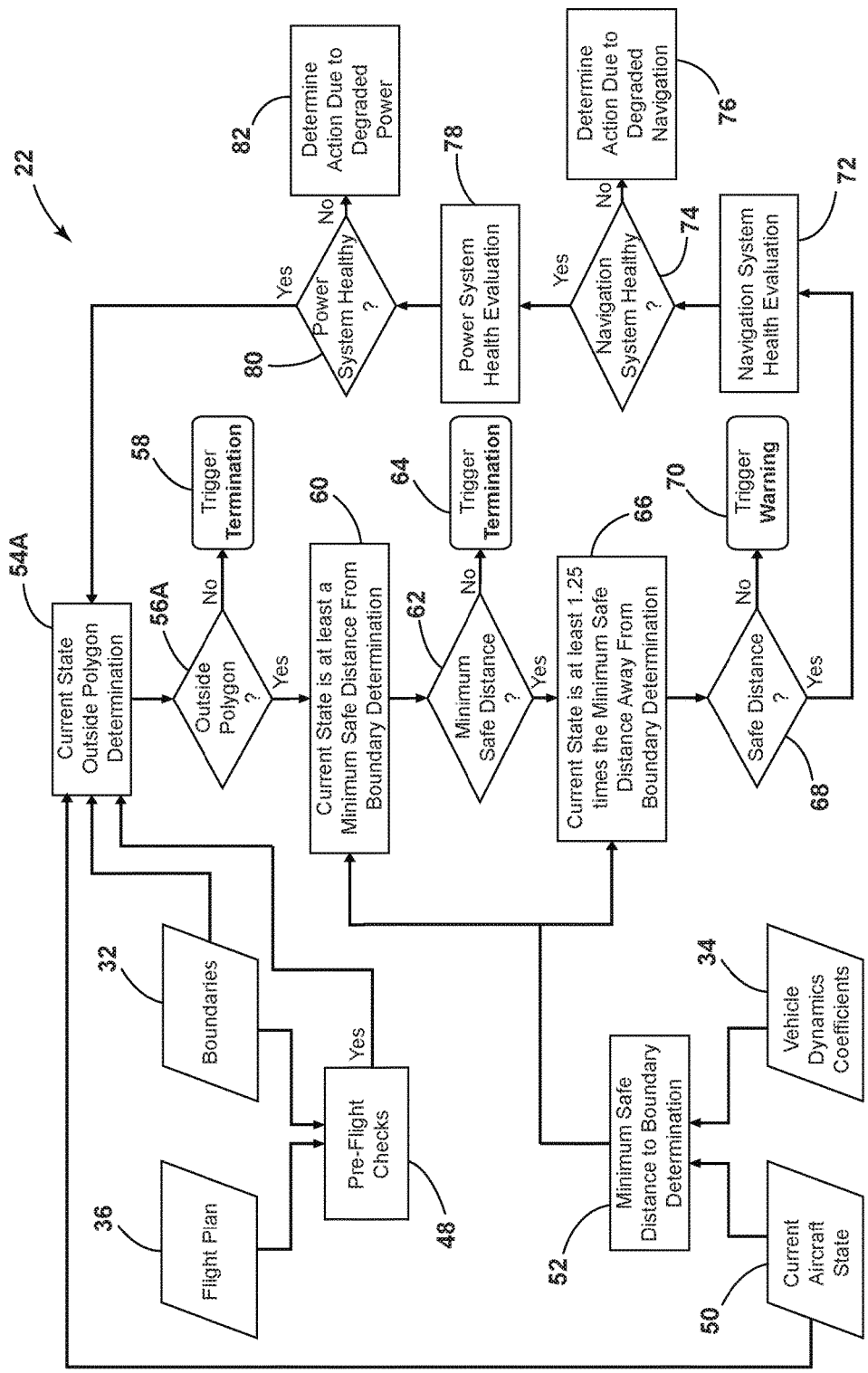
FIG. 4 is a diagram showing detection logic for stay-out regions.

Boundary violation prediction and detection logic for stay-in regions (e.g. stay-in region 40 of FIG. 2) during operation of the Geo-containment system 1 is shown in FIG. 3. Similarly, the boundary violation prediction and detection logic for stay-out regions is shown in FIG. 4. The operating logic of FIGS. 3 and 4 is preferably implemented utilizing boundary violation prediction and detection component 22. It will be understood that the logic diagrams of FIGS. 3 and 4 are not necessarily limited to specific sequences or steps.

Referring to FIG. 3, flight plan data 36 and boundary data 32 are input into pre-flight checks 48. As discussed in more detail below, the pre-flight checks 48 may include evaluating the flight plan 36 to determine if the flight plan will violate a boundary. The vehicle dynamics coefficients 34 and current aircraft state 50 are utilized in a minimum safe distance to boundary determination 52. The minimum safe distance to boundary is shown schematically as the distance D1 in FIG. 2. The block 54 represents a determination if the unmanned aircraft 2 is presently inside a polygon (e.g. hard boundary 38). As shown at 56 and 58, if the unmanned aircraft 2 is not inside the polygon (hard boundary 38), the system triggers termination as shown at 58. Termination may constitute shutting down the propulsion system 12 or other action to immediately stop the flight of the unmanned aircraft 2. Although termination preferably involves eliminating all thrust from propulsion system 12, termination may also comprise reducing propulsion and/or maneuvering the unmanned aircraft 2 so it lands immediately with minimal additional travel.

If the unmanned aircraft 2 is determined to be inside the polygon/hard boundary 38 at step 56, the system then determines if the current state is at least a minimum safe distance D1 from a hard boundary at steps 60 and 62. It will be understood that this is equivalent to determining if the aircraft has crossed ("violated") the soft boundary 44 (FIG. 2). If the unmanned aircraft 2 is at a distance that is less than the minimum safe distance, the system triggers termination as shown at 64. As discussed above, termination may include reducing or eliminating the thrust of propulsion system 12.

As shown at 66 and 68, the system also determines if the current state is at least 1.25 times the minimum safe distance away from the boundary determination. It will be understood that this is equivalent to determining if the unmanned aircraft 2 has crossed ("violated") the warning boundary 46 (FIG. 2). If the unmanned aircraft 2 has crossed the warning boundary 46, the system triggers a warning as shown at 70. Warning 70 may comprise an audio or visual warning to a user (e.g. utilizing graphical user interface 30 and/or speakers of base station 4 (FIG. 1)). The warning 70 may also include or trigger a flight maneuver by an auto pilot system of unmanned aircraft 2. The flight maneuver may be a maneuver that, if possible, changes a flight path of the unmanned aircraft 2 to avoid crossing soft boundary 44, and also avoids hard boundary 38. If the flight maneuver fails to avoid crossing the soft boundary 44, termination is triggered as shown at step 64.

As shown at steps 72, 74, and 76, if the unmanned aircraft 2 is at a safe distance (step 68), the system evaluates the health of the navigation system at 72, and determines an action at step 76 if the navigation system has been degraded. The navigation system health evaluation is discussed in more detail below in connection with FIG. 5.

As shown at 78, 80, and 82, the system also evaluates/monitors the health of the power system 9 of the aircraft and takes action at step 82 if the power system 9 has degraded. The power system monitoring is discussed in more detail below in connection with FIG. 6.

The operating logic of FIG. 4 for stay-out regions is substantially similar to the operating logic for stay-in regions (FIG. 3) discussed above. However, at steps 54A and 56A, the system determines if the aircraft is outside of the polygon, rather than determining if the system is inside the polygon as shown at steps 54 and 56 of FIG. 3. It will be understood that the operating logic of FIGS. 3 and 4 may be utilized simultaneously to control unmanned aircraft 2 if the unmanned aircraft 2 is operating in a region that includes both stay-in regions and stay-out regions as shown in FIG. 2.

Figure 4A:
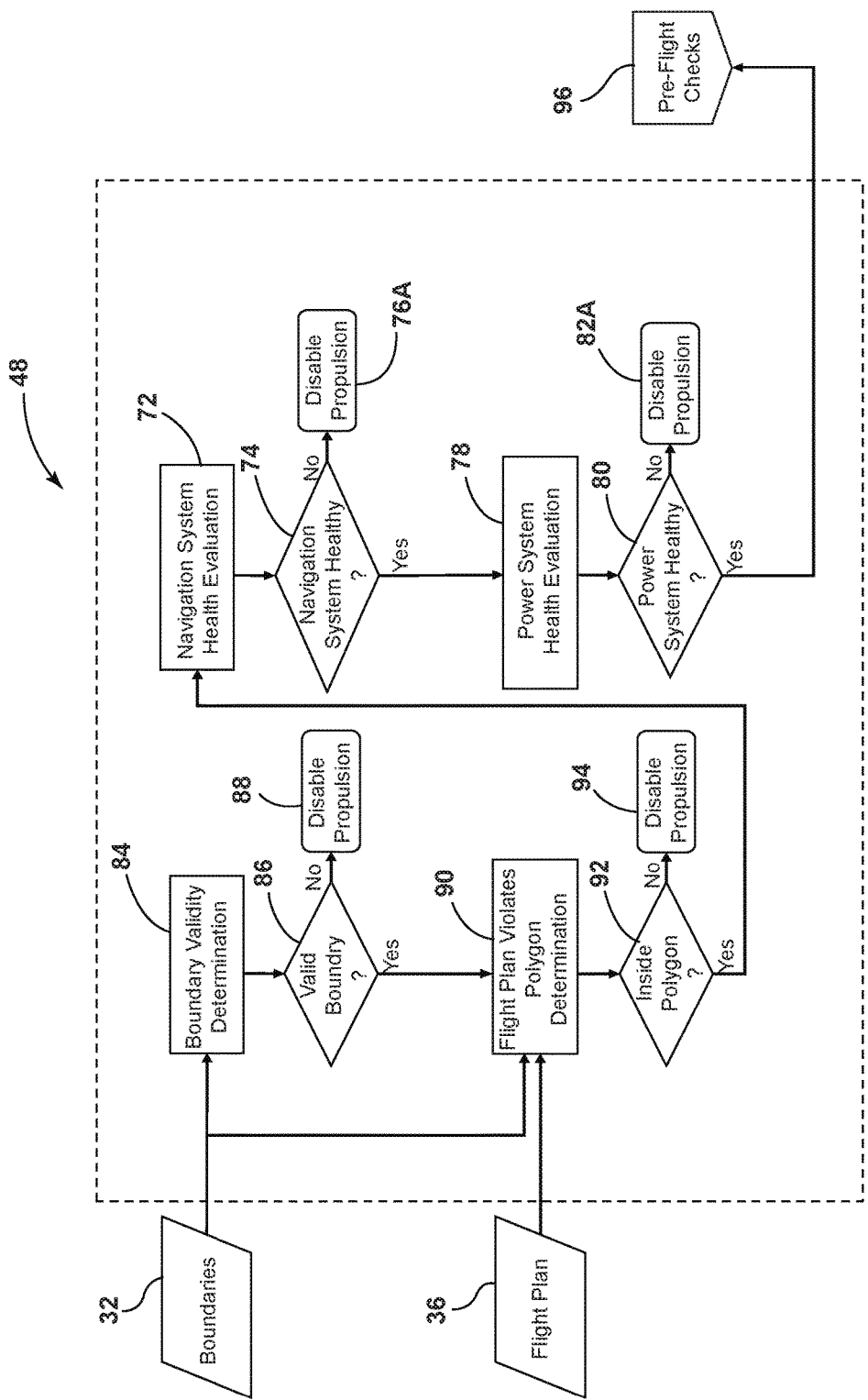
FIG. 4A is a diagram showing boundary violation prediction and detection logic for preflight checks.

With further reference to FIG. 4A, the pre-flight check 48 utilizes the boundary inputs 32 to determine if a valid boundary has been entered as shown at 84 and 86. If the boundary is not valid (e.g. edges of the boundary cross each other and/or have very sharp corners), propulsion is disabled as shown at 88. One or more of the following criteria may be utilized to determine if a boundary (polygon) is valid:

(1) The vertices of the polygon region must be in counter-clockwise order;
(2) No two non-adjacent boundary edges of the polygon region can cross each other or be closer than a first predefined minimum distance;
(3) For two adjacent boundary edges, neither of their non-shared endpoints can be less than a second predefined minimum distance from the other edge;
(4) Two adjacent boundary edges of the polygon region cannot form a sharp corner, (e.g. less than 3 degrees); and
(5) No boundary edge can be less than a predefined minimum length (e.g. 1.0 meter or 0.1 meter).

As shown at steps 90 and 92, the boundary data 32 and flight plan 36 are also evaluated to determine if the flight plan violates a polygon (e.g. hard boundary 38). The flight plan evaluation logic is discussed in more detail below in connection with FIGS. 10A-10C. If the flight plan does not remain inside a boundary polygon, the system disables propulsion as shown at step 94.

If the aircraft will stay inside a polygon at step 92 (or outside a polygon if the boundaries 32 include a stay-out region), the pre-flight checks then proceed to evaluate the navigation system health as shown at 72 and 74. The propulsion system is disabled at 76A if the navigation system is not healthy (i.e. is not operating properly). This may be accomplished by either comparing the independent positioning sources to verify that they agree within an acceptable threshold or by estimating the errors present within the position solutions and verifying that they are below an acceptable threshold. The system then assesses the power system at steps 78 and 80, and disables propulsion at step 82A if the power system is not functioning properly. Evaluation of the health of the Power system is discussed in more detail below in connection with FIGS. 12A-12D. The output 96 of the pre-flight checks may comprise disabling propulsion or allowing propulsion. It will be understood that the output 96 may further comprise an audio and/or visual signal to the operator utilizing the graphical user interface 30. For example, if the pre-flight checks 48 do not detect a problem, the graphical user interface 30 may provide a message indicating that the pre-flight checks have not revealed a problem, and that the unmanned aircraft 2 may proceed. However, a warning signal may also be provided if the pre-flight checks indicate a problem to alert a user concerning the nature of the problem. For example, the graphical user interface 30 may display a message indicating that the flight path will violate a boundary, that the navigation system is not operating properly, and/or that the electrical power system of the unmanned aircraft 2 is not operating properly.

Evaluation of various flight paths is shown schematically in FIGS. 10A-10C. With reference to FIG. 10A, if a flight path 36A is within hard boundary 38 and soft boundary 44, the system does not take any action. The flight plan 36A of FIG. 10A generally corresponds to a "yes" determination at step 92 (FIG. 4A).

With reference to FIG. 10B, if a flight path 36B crosses soft boundary 44, but does not cross hard boundary 38, the system actuates a warning to the operator. The warning may comprise a message that is displayed on graphical user interface 30 (FIG. 1), or other suitable warning to the operator. It will be understood that the flight plan warning of FIG. 10B is not specifically shown in FIG. 4A. However, the determination of FIG. 10B may be implemented utilizing a second determination that is similar to the "inside polygon?" determination at step 92 following a "yes" determination at step 92, which includes warning an operator if soft boundary 44 is violated, but still proceeding to the navigation system health evaluation 72.

With further reference to FIG. 10C, if a flight path 36C crosses both hard boundary 38 and soft boundary 44, the system 1 determines that an invalid flight plan has been entered, and the system 1 disables propulsion. FIG. 10C generally corresponds to the steps 92 and 94 of FIG. 4A.

Figure 5:
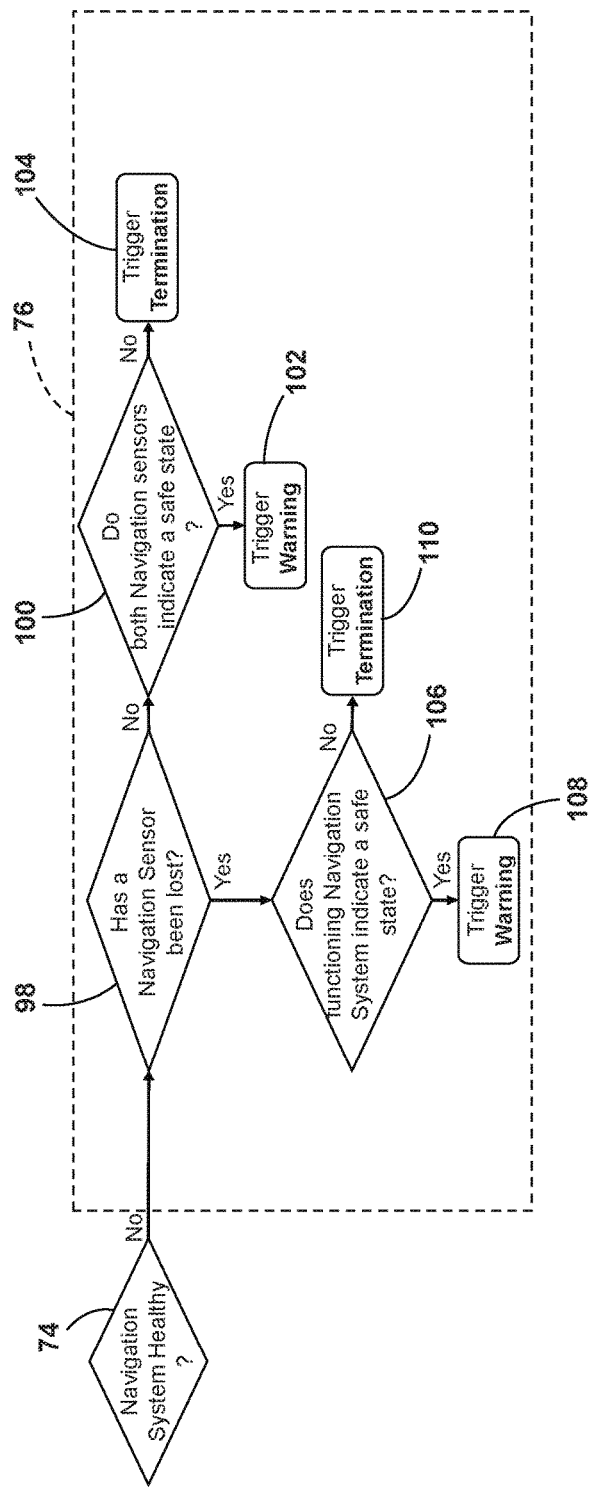
FIG. 5 is a diagram showing operating logic for navigation system monitoring.

With further to FIG. 5, if the navigation systems 14 and/or 16 are not operating properly at step 74 (see also FIGS. 3 and 4), the boundary violation prediction and detection component 22 determines what action to take at step 76. At step 98, the boundary violation prediction and detection component 22 determines if a navigation sensor has been lost. If not, the boundary violation prediction and detection component 22 determines at step 100 if both navigation sensors (alternative PNT system 14 and GPS system 16, FIG. 1) indicate a safe state. If "yes" the system triggers a warning at step 102. If not, the boundary violation prediction and detection component 22 triggers termination at step 104. In general, warning 102 may comprise a message displayed on graphical user interface 30, and termination 104 may comprise halting all thrust from propulsion system 12. If, at step 98, it is determined that a navigation sensor 14 and/or 16 has been lost, the boundary violation prediction and detection component 22 determines if a functioning navigation system 14 or 16 indicate a safe state. If "yes," a warning is triggered as shown at 108. If "no," termination is triggered as shown at 110. Warning 108 may be substantially the same as warning 102, and termination 110 may be substantially the same as termination 104.

Figure 6:
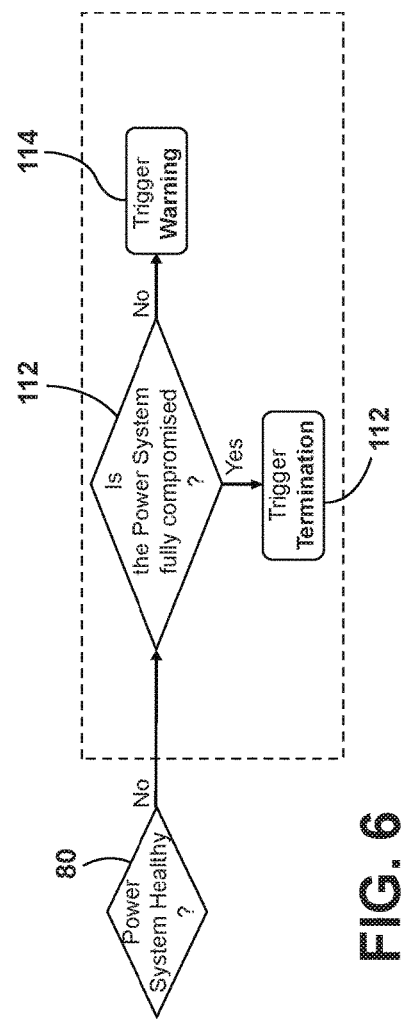
FIG. 6 is a diagram showing operating logic for system power monitoring.

With further reference to FIG. 6, at step 80 (see also FIGS. 3 and 4), the system determines if the power system 9 is operating properly. If "no," at step 112 the boundary violation prediction and detection component 22 determines if the power system is fully compromised. If "yes," the boundary violation prediction and detection component 22 triggers termination at step 112. If "no," the boundary violation prediction and detection component 22 triggers a warning at step 114.

With further reference to FIG. 12A, if the power system 9 is determined to be healthy (i.e. operating within the safe voltage range), the boundary violation prediction and detection component 22 does not take any action. In general, FIG. 12A corresponds to normal operation of unmanned aircraft 2. As shown in FIG. 12B, if the voltage level V is in a range that is below the lowest safe voltage but above the highest unsafe voltage, the boundary violation prediction and detection component 22 may execute a contingency maneuver. In general, the contingency maneuver of FIG. 12B may correspond to the warning 114 of FIG. 6. The contingency maneuver may, for example, involve reducing thrust of propulsion system 12 and causing the unmanned aircraft 2 to land. This maneuver may be executed by auto pilot 7 (FIG. 1) of the unmanned aircraft 2. With reference to FIGS. 12C and 12D, if the voltage V is unsafe because it is either too low (FIG. 12C) or too high (FIG. 12D), the boundary violation prediction and detection component 22 terminates operation of unmanned aircraft 2. Termination may involve preventing propulsion system 12 from producing any thrust. It will be understood that the safe and unsafe voltage criteria may be different for different unmanned aircraft 2, and the invention is not limited to any specific range of voltages.

Figure 7A:
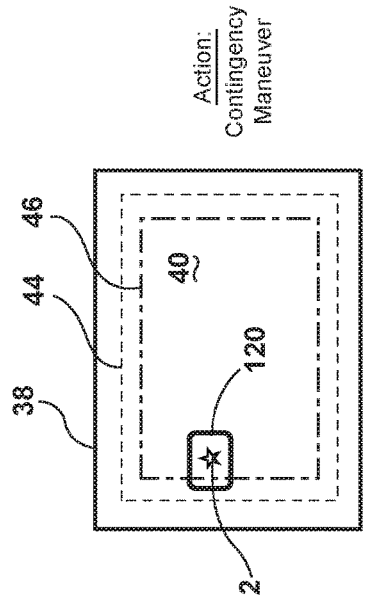
FIG. 7A is a schematic plan view showing lateral boundary evaluation logic for stay-in regions in which an error ellipse is defined around an unmanned aircraft that is inside all boundaries.
Figure 7B:
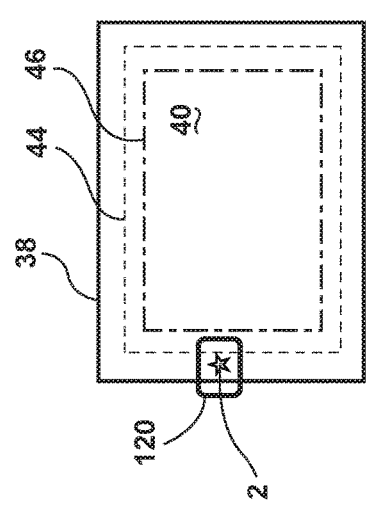
FIG. 7B is a schematic plan view showing lateral boundary evaluation logic for stay-in regions in which the error ellipse has breached a warning boundary.
Figure 7C:
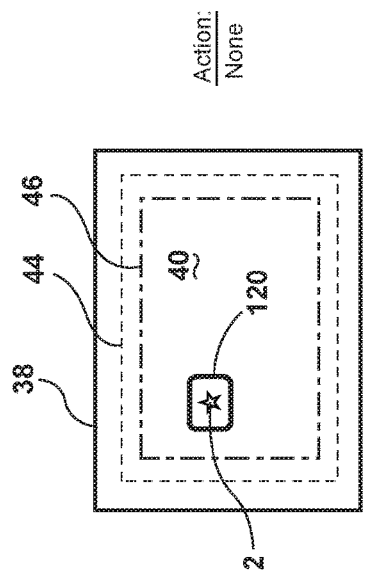
FIG. 7C is a schematic plan view showing lateral boundary evaluation logic for stay-in regions in which the error ellipse has breached a soft boundary.
Figure 7D:
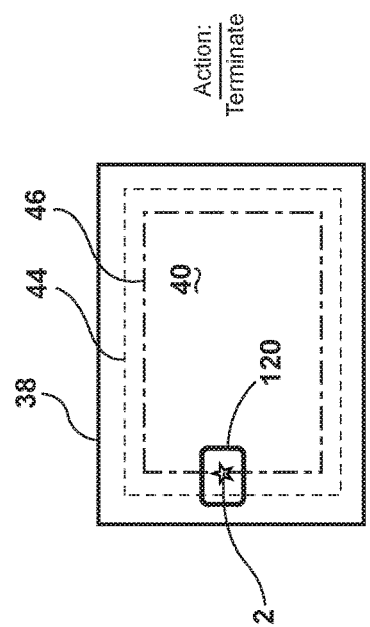
FIG. 7D is a schematic plan view showing lateral boundary evaluation logic for stay-in regions in which the error ellipse has breached a hard boundary.
Figure 8A:
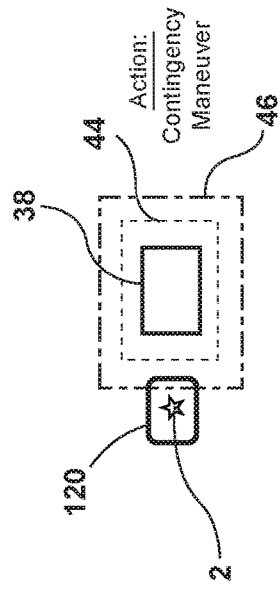
FIG. 8A is a schematic plan view showing lateral boundary evaluation logic for stay-out regions in which an error ellipse defined around an unmanned aircraft is outside all boundaries.
Figure 8B:
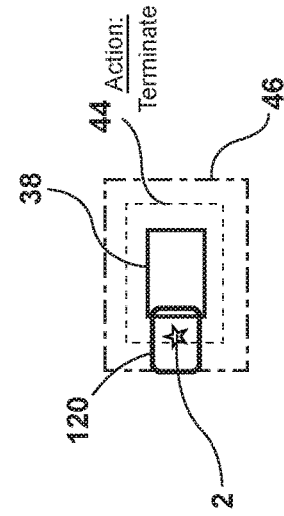
FIG. 8B is a schematic plan view showing lateral boundary evaluation logic for stay-out regions in which the error ellipse has breached a warning boundary.
Figure 8C:
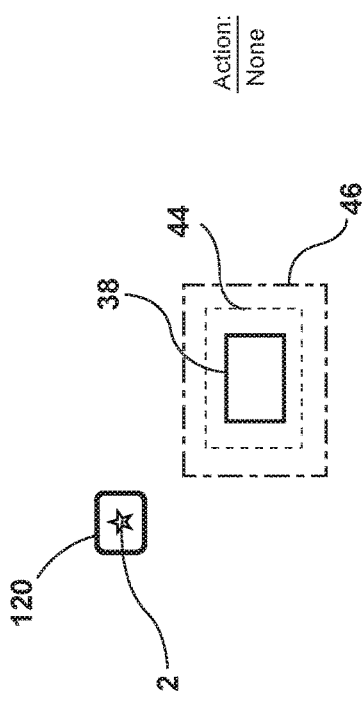
FIG. 8C is a schematic plan view showing lateral boundary evaluation logic for stay-out regions in which the error ellipse has breached a soft boundary.
Figure 8D:
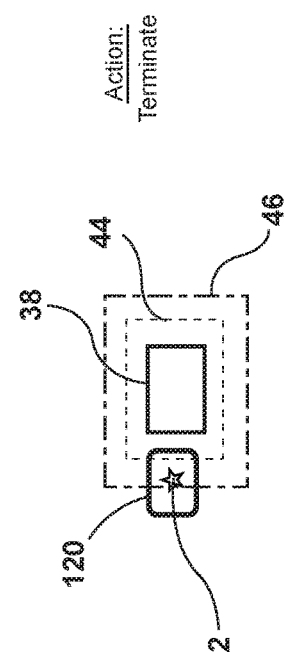
FIG. 8D is a schematic plan view showing lateral boundary evaluation logic for stay-out regions in which the error ellipse has breached a hard boundary.

With further reference to FIGS. 7A-7D, the navigation systems 14 and/or 16 may have uncertainty (error) associated with respect to the accuracy of the position of unmanned aircraft 2. This uncertainty is shown in FIGS. 7A-7D as an "error ellipse" or region 120 around unmanned aircraft 2. It will be understood that error ellipse 120 may be a 3 dimensional (3D) region about unmanned aircraft 2 having a shape defined by the uncertainty of the unmanned aircraft 2 and this shape is not necessarily an ellipse. The lateral boundary evaluation logic for stay-in regions 40 takes into account the error ellipse 120. More specifically, as shown in FIG. 7A, if the error ellipse 120 is inside all boundaries (i.e. including warning boundary 46), no action is taken. However, if the error ellipse crosses warning boundary 46 as shown in FIG. 7B, the boundary violation prediction and detection component 22 executes a contingency maneuver. For example, the boundary violation prediction and detection component 22 may cause the auto pilot 7 to land unmanned aircraft 2 immediately. If the error ellipse 120 crosses the soft boundary 44 (FIG. 7C) or the hard boundary 38 (FIG. 7D), the boundary violation prediction and detection component 22 terminates operation of unmanned aircraft 2. Termination may involve stopping all thrust of propulsion system 12. In general, the boundary violation prediction and detection component 22 will terminate operation when the error ellipse 120 crosses the soft boundary 44 (FIG. 7C), such that the unmanned aircraft 2 does not reach the position of FIG. 7D in which error ellipse 120 crosses hard boundary 38. Nevertheless, the boundary violation prediction and detection component 22 is configured to terminate operation if the error ellipse 120 does cross hard boundary 38 as shown in FIG. 7D.

The lateral boundary evaluation logic for stay-out regions is shown in FIGS. 8A-8D. In general, the logic operation of FIGS. 8A-8D corresponds to the operating logic for the stay-in regions of FIGS. 7A-7D, respectively. When the error ellipse 120 is outside of all boundaries (FIG. 8A) the boundary violation prediction and detection component 22 does not take any action, and the unmanned aircraft 2 continues to operate in a normal manner. If the error ellipse 120 crosses warning boundary 46 (FIG. 8B), the boundary violation prediction and detection component 22 causes the auto pilot 7 to execute a contingency maneuver. If the error ellipse 120 crosses the soft boundary 44 (FIG. 8C) or the hard boundary 38 (FIG. 8D), the boundary violation prediction and detection component 22 terminates operation of unmanned aircraft 2.

The boundary evaluation logic for vertical boundaries is shown in FIGS. 9A-9D. If the error ellipse 120 is inside all boundaries (FIG. 9A), the boundary violation prediction and detection component 22 does not take any action, and the unmanned aircraft 2 continues to operate in a normal manner. If the error ellipse 120 crosses warning boundary 46, the boundary violation prediction and detection component 22 executes a contingency maneuver (e.g. auto pilot 7 causes unmanned aircraft 2 to land immediately). If the error ellipse 120 crosses the soft boundary 44 (FIG. 9C) or a hard boundary 38 (FIG. 9D), the boundary violation prediction and detection component 22 terminates operation by shutting off all thrust of propulsion system 12. As shown in FIGS. 9A-9D, both upper and lower boundaries may be entered to limit vertical travel of the unmanned aircraft 2 in both upward and downward directions. It will be understood that only an upper boundary, only a lower boundary, or both may be entered, depending upon the circumstances (i.e. restrictions) present in the area in which the unmanned aircraft 2 is being flown.

Figure 11A:
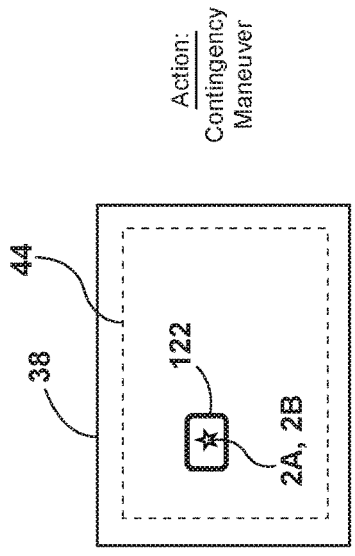
FIG. 11A is a schematic plan view showing navigation system evaluation logic for normal operation.

With further reference to FIGS. 11A-11D, the alternative navigation system 14 may provide a first aircraft location 2A, and the GPS navigation system 16 may provide a second aircraft location 2B that is not exactly the same as the position 2A. The locations 2A and 2B have error boundaries that, when combined, produce an error ellipse 122. As shown in FIG. 11A, during normal operation the error ellipse 122 is within all boundaries (i.e. soft boundary 44 and hard boundary 38), and the boundary violation prediction and detection component 22 takes no action such that the unmanned aircraft 2 operates in its normal manner.

Figure 11B:
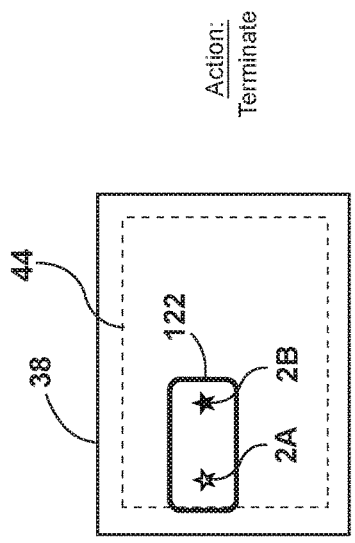
FIG. 11B is a schematic plan view showing navigation system evaluation logic in which there is a loss of one navigation system.

With reference to FIG. 11B if one of the navigation systems 14 or 16 is lost, such that a single aircraft location 2A or 2B is available, the boundary violation prediction and detection component 22 causes the auto pilot 7 to execute a contingency maneuver. The contingency maneuver may comprise landing the unmanned aircraft 2.

Figure 11C:
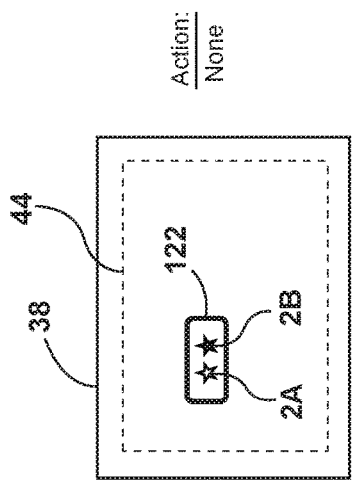
FIG. 11C is a schematic plan view showing navigation system evaluation logic in which an unacceptable but safe position discrepancy is detected.
Figure 11D:
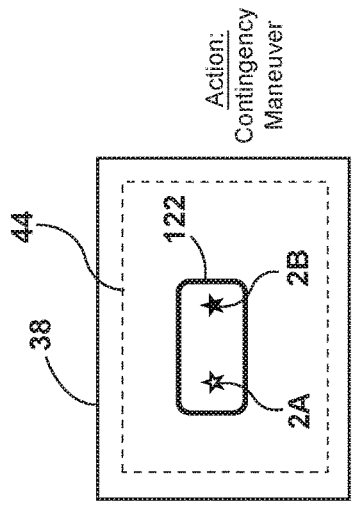
FIG. 11D is a schematic plan view showing navigation system evaluation logic in which an unacceptable and unsafe position discrepancy is detected.

With further reference to FIG. 11C, if the positions 2A and 2B provided by the navigation systems 14 and 16, respectively, show an unacceptably high discrepancy, and if the combined error ellipse 122 is within both boundaries 44 and 38, the boundary violation prediction and detection component 22 causes the auto pilot 7 to execute a contingency maneuver (e.g. landing unmanned aircraft 2). However, as shown in FIG. 11D, if the navigation systems 14 and 16 produce an unacceptable discrepancy between the aircraft positions 2A and 2B, and if the combined error ellipse 122 crosses soft boundary 44 (or hard boundary 38), the boundary violation prediction and detection component 22 causes the auto pilot 7 to terminate flight by eliminating all thrust from propulsion system 12.

What is claimed is:

1. A geo-containment system, comprising:
    an unmanned aircraft;
    a first navigation system that is GPS-based, wherein the first navigation system provides a position of the unmanned aircraft during flight that is accurate to within a first error distance,
    a second navigation system that is GPS-independent, wherein the second navigation system provides a position of the unmanned aircraft during flight that is accurate to within a second error distance,
    a control system configured to limit flight of the unmanned aircraft while the unmanned aircraft is in operation based, at least in part, on pre-defined geo-spatial operational boundaries including a primary geo-spatial operational boundary and at least one secondary geo-spatial operational boundary that is spaced apart from the primary geo-spatial operational boundary at a minimum safe distance, and wherein the minimum safe distance is determined in real-time while the unmanned aircraft is in flight utilizing, at least in part, (1) state information of the unmanned aircraft including a position and velocity of the unmanned aircraft, including the greater of the first and second error distances, and (2) predetermined dynamics coefficients of the unmanned aircraft, and wherein the control system is configured to alter operation of the unmanned aircraft if the unmanned aircraft violates the secondary geo-spatial operational boundary by moving the unmanned aircraft to a position in which the unmanned aircraft is more than the minimum safe distance from the primary geospatial operational boundary.

2. The geo-containment system of claim 1, wherein:
the control system is configured to terminate operation of the unmanned aircraft if the unmanned aircraft violates either the primary geo-spatial operational boundary or the secondary geo-spatial operational boundary.

3. The geo-containment system of claim 1, wherein
the at least one secondary geo-spatial operational boundary comprises a warning boundary and a soft boundary located between the warning boundary and the primary geospatial operational boundaries; and
the soft boundary is at the minimum safe distance from the primary geo-spatial operational boundary.

4. The geo-containment system of claim 3, wherein:
the warning boundary is spaced apart from the primary geo-spatial operational boundary a distance that is equal to a scale factor times the minimum safe distance.

5. The geo-containment system of claim 4, wherein:
the control system is configured to generate a warning signal if the unmanned aircraft crosses the warning boundary.

6. The goo-containment system of claim 5, wherein:
the unmanned aircraft includes a control system that causes the unmanned aircraft to perform a contingency maneuver if a warning signal is generated by the control system, and wherein the contingency maneuver includes causing the unmanned aircraft to 1) turn; and/or 2) reduce altitude; and/or 3) reduce speed.

7. The geo-containment system of claim 1, wherein:
the second navigation system comprises a local positioning system that utilizes a plurality of ground-based beacons to determine a position of the unmanned aircraft in flight.

8. The geo-containment system of claim 1, wherein:
the geo-spatial operational boundaries comprise at least one of a stay-in region and a stay-out region.

9. The geo-containment system of claim 2, wherein:
the unmanned aircraft includes a propulsion system that provides thrust; and
the control system terminates operation of the unmanned aircraft by reducing the thrust of the propulsion system.

10. The geo-containment system of claim 1, wherein:
the geo-containment system is configured to receive and evaluate a flight plan prior to flight of the unmanned aircraft;
the geo-containment system is configured to determine if the flight plan will cause the unmanned aircraft to violate at least one of the primary geo-spatial operational boundary and the secondary geo-spatial operational boundary.

11. The go-containment system of claim 10, wherein:
the unmanned aircraft includes a propulsion system; and
the geo-containment system is configured to disable the propulsion system, while the unmanned aircraft is in flight, if the flight plan will cause the unmanned aircraft to violate primary geo-spatial operational boundary.

12. The gee-containment system of claim 1, wherein:
the primary goo-spatial operational boundary comprises a two-dimensional polygon defining at least one of a lateral boundary and a vertical boundary.

13. A method of controlling an unmanned aircraft, the method comprising:
providing a primary geo-spatial operational boundary;
independently determining a position of the unmanned aircraft using first and second navigation systems, wherein the first navigation system is GPS-based and the second navigation system is GPS-independent;
determining at least one secondary geo-spatial operational boundary that is spaced apart from the primary geo-spatial operational boundary at a minimum safe distance, wherein the minimum sage distance is determined while the unmanned aircraft is in flight utilizing, at least in part: (1) state information of the unmanned aircraft including position and velocity of the unmanned aircraft, and (2) predetermined dynamics coefficients of the unmanned aircraft, wherein the minimum safe distance includes a maximum position error of the first and second navigation systems, and:
altering operation of the unmanned aircraft when the unmanned aircraft crosses the secondary geo-spatial operation boundary, including moving the unmanned aircraft to a position in which the unmanned aircraft is less than the minimum safe distance from the primary geo-spatial operational boundary.

14. The method of claim 13, including:
terminating operation of the unmanned aircraft if the unmanned aircraft violates the primary geo-spatial operational boundary.

15. The method of claim 14, including:
determining a location of a warning boundary, wherein the warning boundary is spaced apart from the primary geo-spatial operational boundary a distance that is greater than the minimum safe distance.

16. The method of claim 15, including:
generating a warning signal and/or causing the unmanned aircraft to perform a contingency maneuver if the unmanned aircraft crosses the warning boundary, wherein the contingency maneuver includes turning and/or reducing altitude and/or reducing speed.

17. The method of claim 13, including:
evaluating a flight plan prior to flight of the unmanned aircraft to determine if the flight plan will cause the unmanned aircraft to violate at least one of the primary geo-spatial operational boundary and the secondary geo-spatial operational boundary; and
generating a warning and/or at least partially disabling the unmanned aircraft if the flight plan will cause the unmanned aircraft to violate at least one of the primary geo-spatial operational boundary and the secondary goo-spatial operational boundary.

18. The method of claim 14, wherein terminating Operation of the unmanned aircraft if the unmanned aircraft violates includes disabling a propulsion system of the unmanned aircraft while the unmanned aircraft is flying in an autopilot mode.

19. The geo-containment system of claim 1, wherein operation of the geo-containment system is independent of all other on-hoard components of the unmanned aircraft.

* * * * *